(12) United States Patent
Matsuo

(10) Patent No.: US 12,166,935 B2
(45) Date of Patent: Dec. 10, 2024

(54) INFORMATION PROCESSING APPARATUS AND NON-TRANSITORY COMPUTER READABLE MEDIUM STORING INFORMATION PROCESSING PROGRAM WITHOUT DISPLAYING SCREEN FOR SETTING STEP OF TARGET IMAGE SEPARATELY FROM SCREEN FOR OPERATION STEP OF TARGET IMAGE

(71) Applicant: FUJIFILM Business Innovation Corp., Tokyo (JP)

(72) Inventor: Yoshie Matsuo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 533 days.

(21) Appl. No.: 17/337,024

(22) Filed: Jun. 2, 2021

(65) Prior Publication Data
US 2022/0201142 A1 Jun. 23, 2022

(30) Foreign Application Priority Data
Dec. 23, 2020 (JP) ................................. 2020-214208

(51) Int. Cl.
H04N 1/04 (2006.01)
G06V 30/414 (2022.01)
G06V 30/416 (2022.01)
H04N 1/00 (2006.01)

(52) U.S. Cl.
CPC ....... *H04N 1/00779* (2013.01); *G06V 30/414* (2022.01); *G06V 30/416* (2022.01); *H04N 1/00331* (2013.01); *H04N 1/00782* (2013.01)

(58) Field of Classification Search
None
See application file for complete search history.

(56) References Cited

U.S. PATENT DOCUMENTS

| 9,904,672 B2 * | 2/2018 | Pino ...................... G06F 40/289 |
| 2011/0280481 A1 * | 11/2011 | Radakovic ........... G06V 10/987 382/311 |
| 2016/0227062 A1 * | 8/2016 | Miyazaki ........... H04N 1/00663 |

(Continued)

FOREIGN PATENT DOCUMENTS

| JP | H10-334182 A | 12/1998 |
| JP | 2012-073749 A | 4/2012 |

(Continued)

OTHER PUBLICATIONS

Oct. 1, 2024 Office Action issued in Japanese Patent Application No. 2020-214208.

*Primary Examiner* — Dung D Tran
(74) *Attorney, Agent, or Firm* — Oliff PLC

(57) ABSTRACT

An information processing apparatus includes a processor configured to: acquire, by using setting information for extraction of texts from an image, an extraction result by extracting texts from a target image obtained by reading a document, or an output result to be output to an outside based on the extraction result; display the extraction result or the output result together with a first screen configured to receive an instruction to change the setting information; and in response to reception of the instruction, display a second screen configured to accept a change of the setting information related to the target image.

15 Claims, 12 Drawing Sheets

(56) References Cited

U.S. PATENT DOCUMENTS

| | | | | |
|---|---|---|---|---|
| 2017/0064102 A1* | 3/2017 | Fujii | ............... | H04N 1/00482 |
| 2019/0098154 A1* | 3/2019 | Baba | ............... | H04N 1/0044 |
| 2020/0310704 A1* | 10/2020 | Hanano | ............... | G06F 3/1204 |
| 2020/0382661 A1* | 12/2020 | Ito | ............... | H04N 1/38 |
| 2020/0400930 A1* | 12/2020 | D'Costa | ............... | G16H 10/40 |

FOREIGN PATENT DOCUMENTS

| | | |
|---|---|---|
| JP | 2016-009223 A | 1/2016 |
| JP | 2019-095849 A | 6/2019 |

\* cited by examiner

INFORMATION PROCESSING APPARATUS AND NON-TRANSITORY COMPUTER READABLE MEDIUM STORING INFORMATION PROCESSING PROGRAM WITHOUT DISPLAYING SCREEN FOR SETTING STEP OF TARGET IMAGE SEPARATELY FROM SCREEN FOR OPERATION STEP OF TARGET IMAGE

CROSS-REFERENCE TO RELATED APPLICATIONS

This application is based on and claims priority under 35 USC 119 from Japanese Patent Application No. 2020-214208 filed Dec. 23, 2020.

BACKGROUND

(i) Technical Field

The present disclosure relates to an information processing apparatus and a non-transitory computer readable medium storing an information processing program.

(ii) Related Art

Japanese Unexamined Patent Application Publication No. 10-334182 discloses a technology relating to a reading position information correction system that outputs reading position information for use in character reading to an optical character reader that reads and recognizes characters on a form, and corrects the reading position information based on a character reading/recognition result from the optical character reader. The system includes a display that displays image data of the form, a corrector that corrects the reading position information based on an external input, and a display controller that causes a display screen of the display to display a character reading/recognition result from the optical character reader that has read and recognized characters based on the corrected reading position information.

SUMMARY

Aspects of non-limiting embodiments of the present disclosure relate to a case where texts are extracted from an image by optical character recognition (OCR) and output to the outside. There is provided a service in which texts are extracted from an image obtained by reading each document based on information preset for the document (hereinafter referred to as "setting information") and output to the outside. This service includes a step of setting the setting information for extracting texts from an image of each document and outputting the extracted texts to the outside. In an operation step, texts are extracted from a target image (image of written form) and output to the outside by using the setting information.

If texts are not appropriately extracted from the target image or output in the operation step due to inadequacy in the setting information, the operation step is suspended and the setting information is changed by displaying a screen for the setting step separately from the screen for the operation step.

Aspects of non-limiting embodiments of the present disclosure therefore relate to an information processing apparatus and a non-transitory computer readable medium storing an information processing program, which are capable of changing the setting information without displaying the screen for the setting step separately from the screen for the operation step in the event of inadequacy in the result of text extraction or output in the operation step for the target image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to: acquire, by using setting information for extraction of texts from an image, an extraction result by extracting texts from a target image obtained by reading a document, or an output result to be output to an outside based on the extraction result; display the extraction result or the output result together with a first screen configured to receive an instruction to change the setting information; and in response to reception of the instruction, display a second screen configured to accept a change of the setting information related to the target image.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is described below in detail with reference to the drawings. In this exemplary embodiment, any screen transitions to a different screen while continuing a series of processes in the same application, but the screen transition method is not limited thereto. For example, the processes may be continued by pressing a tab on the screen to display different contents on the screen, or by displaying a smaller screen together with the current screen. That is, any screen and the different screen have dependence in the series of processes in the same application. In other words, the different screen is not a screen independent of the screen related to the series of processes, such as a screen related to a different application or a screen displayable at any timing independent of the series of processes. A separate screen refers to a screen independent of the screen related to the series of processes, such as a screen related to a different application or a screen displayable at any timing independent of the series of processes.

Figure 1:
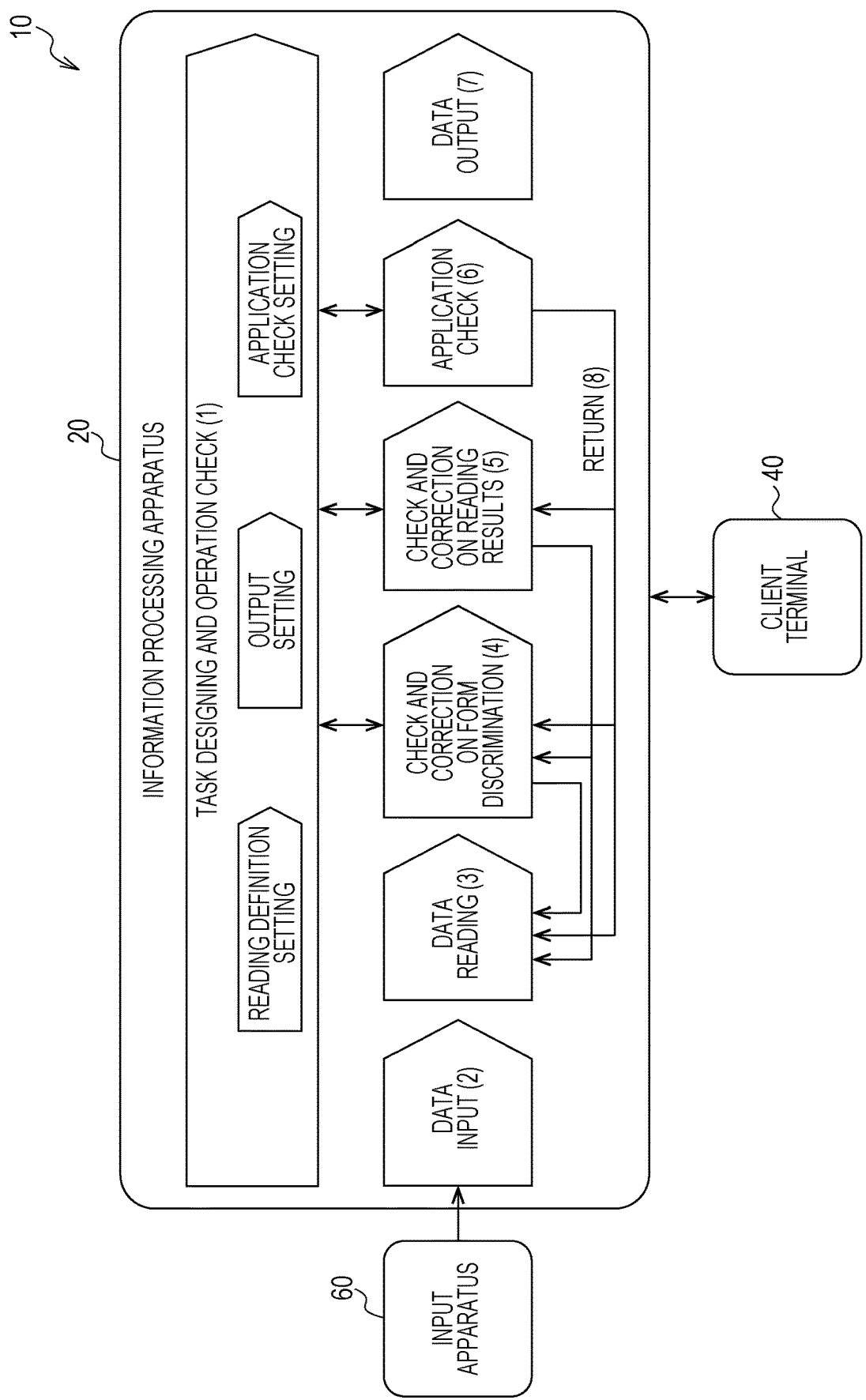
FIG. 1 is a block diagram illustrating an example of the overall configuration of a form system according to an exemplary embodiment.

FIG. 1 illustrates the overall configuration of a form system 10 according to this exemplary embodiment. As illustrated in FIG. 1, the form system 10 includes an information processing apparatus 20, a client terminal 40, and an input apparatus 60. Those apparatuses are connected to a network (not illustrated) and communicable with each other via the network. Examples of the network include the Internet, a local area network (LAN), and a wide area network (WAN).

The information processing apparatus 20 manages a flow of sequential processes that involve executing optical character recognition (OCR) on image data of a plurality of documents including forms input via the input apparatus 60 and outputting OCR results to a preset destination. The image data according to this exemplary embodiment may be any image data as long as the image data is related to a document including texts, such as an invoice, an application form, or a receipt. The specific configuration and operation of the information processing apparatus 20 are described later.

The client terminal 40 transmits various OCR-related instructions to the information processing apparatus 20. Examples of the instructions include an instruction to start information reading from image data, and an instruction to display the information read from the image data. The client terminal 40 displays various types of information such as results and notifications related to the OCR executed by the information processing apparatus 20 in response to the received instructions. Examples of the client terminal 40 include a server computer and a general computer such as a personal computer (PC). Although FIG. 1 illustrates one client terminal 40, the number of client terminals 40 is not limited thereto, and a plurality of client terminals 40 may be prepared. For example, the client terminals 40 may be used selectively for individual processes.

The input apparatus 60 inputs image data for OCR to the information processing apparatus 20. Examples of the input apparatus 60 include a server computer, a general computer such as a PC, and an image forming apparatus having a scanning function, a printing function, and a facsimile function. In addition to the input apparatus 60, the client terminal 40 may also input image data to the information processing apparatus 20.

Next, an overview of the form system 10 is described. In the form system 10, the information processing apparatus 20 executes OCR on image data input via the input apparatus 60, and outputs OCR results to a preset destination.

In the OCR, the information processing apparatus 20 manages various processes such as (1) task designing and operation check, (2) data input, (3) data reading, (4) check and correction on form discrimination, (5) check and correction on reading results, (6) application check, (7) data output, and (8) return. In this exemplary embodiment, the OCR includes a post-process such as correction of texts as well as the process of reading texts and symbols from image data.

As an example of the management of the processes, the information processing apparatus 20 automatically executes (1) task designing and operation check, (2) data input, (3) data reading, (6) application check, and (7) data output. As an example of the management of the processes, a user inputs instructions via the client terminal 40 to execute (4) check and correction on form discrimination and (5) check and correction on reading results. As an example of the management of the processes, the information processing apparatus 20 may automatically execute (8) return or the user may input an instruction via the client terminal 40 to execute (8) return.

In (1) task designing and operation check, job rules including reading definition setting, output setting, and application check setting are created. In the reading definition setting, for example, an information reading range on image data is set for "(3) data reading". More specifically, such a definition is set that a value of an item is read from a portion on the right of a key item. In the output setting, for example, a format and a destination of a data file to be output in "(7) data output" are set. In the application check setting, formats of a form to be subjected to "(6) application check", such as required items and the number of inputtable characters, are set. The reading range according to this exemplary embodiment is an example of "extraction range".

In (2) data input, image data input from the input apparatus 60 is received. The received image data is registered as a job, which is a unit of execution of "(3) data reading".

In (3) data reading, information is read from the image data in the job based on its job rule selected by the user from among the job rules created in "(1) task designing and operation check". For example, this process involves discrimination of a form indicated by the image data in the job (hereinafter referred to as "form discrimination") and reading of texts and symbols in the reading range.

In (4) check and correction on form discrimination, the image data in the job is split into records indicating the form in the job based on a result of the form discrimination executed in "(3) data reading". In this process, the records are displayed and user's check and correction on the form discrimination are accepted.

In (5) check and correction on reading results, results of the reading of the texts and symbols in the reading range in "(3) data reading" are displayed and user's check and correction on the reading results are accepted.

In (6) application check, errors in the preceding processes in the job are detected based on the application check setting included in the job rule selected by the user from among the job rules created in "(1) task designing and operation check". Detection results may be presented to the user.

In (7) data output, output data in the job is created based on the output setting included in the job rule selected by the user from among the job rules created in "(1) task designing and operation check", and the created output data is output to the preset destination.

In (8) return, any process executed in the OCR is returned to a process at one or more steps earlier. For example, the process is returned in response to a user's instruction from the client terminal 40 during execution of "(4) check and correction on form discrimination" or "(5) check and correction on reading results". For example, the process is returned in response to an administrator's instruction from the client terminal 40 depending on a result of administrator's check between "(6) application check" and "(7) data output".

In the OCR, "(1) task designing and operation check" are executed prior to execution of "(3) data reading" and the subsequent processes, that is, prior to operation of the form system 10. Alternatively, "(1) task designing and operation check" may be executed during the operation of the form system 10 that is executing "(3) data reading" and the subsequent processes. For example, the job rules created in "(1) task designing and operation check" prior to the operation of the form system 10 may be revised as appropriate depending on results of "(5) check and correction on reading results" in the operating form system 10.

Figure 2:
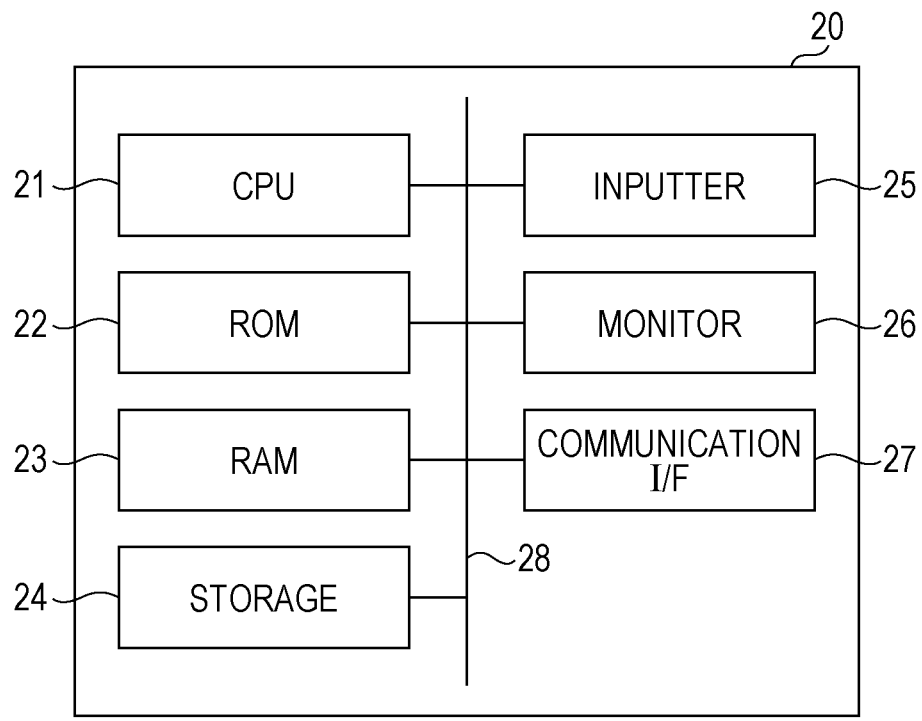
FIG. 2 is a block diagram illustrating an example of the hardware configuration of an information processing apparatus according to the exemplary embodiment.

Next, the configuration of the information processing apparatus 20 is described with reference to FIG. 2. FIG. 2 is a block diagram illustrating an example of the hardware configuration of the information processing apparatus 20 according to this exemplary embodiment. For example, the information processing apparatus 20 according to this exemplary embodiment is, but not limited to, a terminal such as a personal computer or a server. The information processing apparatus 20 may be mounted on an image forming apparatus such as a multifunction peripheral.

As illustrated in FIG. 2, the information processing apparatus 20 according to this exemplary embodiment includes a central processing unit (CPU) 21, a read only memory (ROM) 22, a random access memory (RAM) 23, a storage 24, an inputter 25, a monitor 26, and a communication interface (I/F) 27. The CPU 21, the ROM 22, the RAM 23, the storage 24, the inputter 25, the monitor 26, and the communication I/F 27 are connected by a bus 28. The CPU 21 is an example of a processor.

The CPU 21 controls the overall information processing apparatus 20. The ROM 22 stores data and various programs including an information processing program according to this exemplary embodiment. The RAM 23 serves as a working area during execution of the programs. The CPU 21 executes the programs stored in the ROM 22 by loading the programs on the RAM 23, thereby displaying images and texts. Examples of the storage 24 include a hard disk drive (HDD), a solid state drive (SSD), and a flash memory. The storage 24 may store the information processing program and the like. Examples of the inputter 25 include a mouse and a keyboard that receive operation of inputting texts and the like. The monitor 26 displays screens. The communication I/F 27 transmits and receives data.

Figure 3:
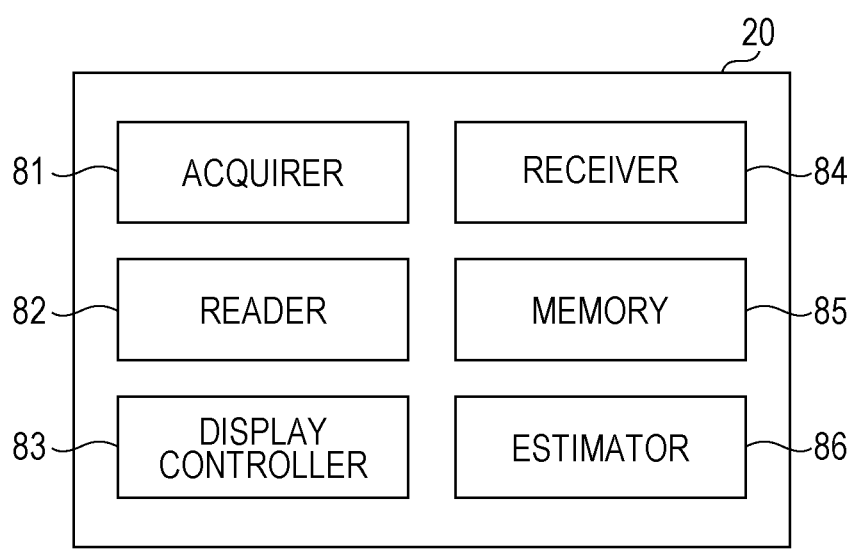
FIG. 3 is a block diagram illustrating an example of the functional configuration of the information processing apparatus according to the exemplary embodiment.

Next, the functional configuration of the information processing apparatus 20 is described with reference to FIG. 3. FIG. 3 is a block diagram illustrating an example of the functional configuration of the information processing apparatus 20 according to this exemplary embodiment.

As illustrated in FIG. 3, the information processing apparatus 20 includes an acquirer 81, a reader 82, a display controller 83, a receiver 84, a memory 85, and an estimator 86 as functional components. The CPU 21 executes the information processing program to function as the acquirer 81, the reader 82, the display controller 83, the receiver 84, the memory 85, and the estimator 86.

The acquirer 81 acquires image data obtained by reading a document.

The reader 82 executes OCR on the acquired image data to acquire results of reading of the texts in the image data. The reading results according to this exemplary embodiment are obtained by reading the texts in the image data and extracting the read texts as character codes. The reading result according to this exemplary embodiment is an example of "extraction result". The reader 82 according to this exemplary embodiment acquires the reading results by reading the texts from the image data based on information that is related to settings on the text reading (hereinafter referred to as "setting information") and stored in the memory 85 described later. The setting information according to this exemplary embodiment is related to reading settings and output settings. The reading settings include a form layout about items in a document and positions of texts, a text reading range on image data, and dictionaries to determine candidates for identification of read texts as character codes. The output settings are about output formats of reading results.

The display controller 83 causes a screen to display the image data and the reading results (hereinafter referred to as "read data"). The display controller 83 also displays a screen for changing the setting information. The read data according to this exemplary embodiment includes the image data and the reading results, but is not limited thereto. The read data may include a job name that is the name of the read data, a date of modification (correction or change), and a date of registration in the information processing apparatus 20.

Figure 4:
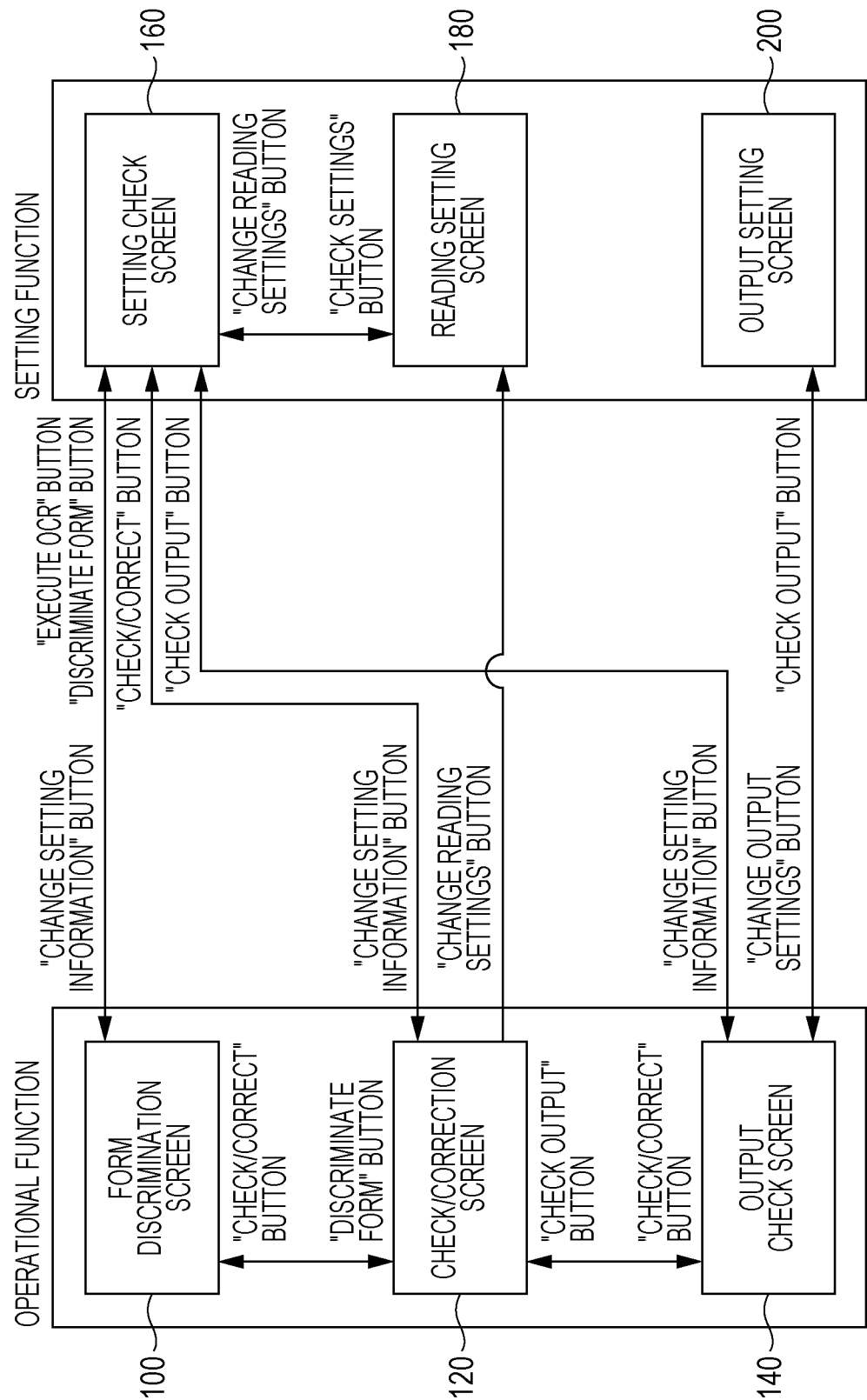
FIG. 4 illustrates an example of transition to each screen according to the exemplary embodiment.

The receiver 84 receives screen display instructions, corrected read data, and changed setting information. As illustrated in FIG. 4, examples of the screens according to this exemplary embodiment include a form discrimination screen 100, a check/correction screen 120, and an output check screen 140 for operational functions, and a setting check screen 160, a reading setting screen 180, and an output setting screen 200 for setting functions. The operational functions are functions of checking and outputting data read from image data. The operational functions correspond to "(4) check and correction on form discrimination" and "(5) check and correction on reading results" of FIG. 1, and the administrator's check between "(6) application check" and "(7) data output". The setting functions are functions of accepting a change of the setting information. The setting functions correspond to the reading definition setting and the output setting in "(1) task designing and operation check" of FIG. 1.

In the example of FIG. 4, the screens related to the operational functions and the setting functions include buttons for transition to different screens, and receive instructions for transition to different screens, check and correction on read data, and a change of the setting information. The buttons for transition to different screens are examples of "image element".

Each screen related to the operational function in FIG. 4 includes a "change setting information" button. By pressing the "change setting information" button, the screen transitions to the setting check screen 160. For example, the form discrimination screen 100 transitions to the setting check screen 160 by pressing the "change setting information" button. The setting check screen 160 displays currently read data and setting information related to the read data, and accepts a change of the setting information.

The check/correction screen 120 includes a "change reading settings" button. The output check screen 140 includes a "change output settings" button. Depending on contents displayed on each screen related to the operational function, the screen may transition to a screen that accepts a change of setting in the setting function. In this exemplary embodiment, the screen related to the operational function includes the button linked to the screen related to the setting function, but is not limited thereto. The screen related to the operational function may transition to a corresponding screen related to the setting function in response to pressing of the "change setting information" button.

After the change of setting is accepted on each screen related to the setting function in FIG. 4, the screen may transition to the screen related to the operational function. In this case, the screen displays read data that reflects the changed setting information. The screens are described later in detail with reference to FIG. 5 to FIG. 10.

The memory 85 illustrated in FIG. 3 stores the read data and the setting information in association with each other. As the setting information, the memory 85 according to this exemplary embodiment stores information related among items in image data. Examples of the information related among the items include information belonging to the same target, such as an item "biller name" and an item "biller address". The text according to this exemplary embodiment is a content written in association with an item, such as "Minneapolis, Minn.".

In response to failure in reading of a text from image data, the estimator 86 estimates a dictionary for identifying the text as a character code by using an item associated with the text and the information related among the items. If the estimated dictionary differs from a dictionary related to the item set in the setting information, the estimator 86 presents the estimated dictionary as a candidate to prompt the user to change the dictionary. For example, in response to failure in reading of a text "Minneapolis, Minn.", the estimator 86 estimates a dictionary by using the item "biller address" associated with the text and the setting information that is set for "biller name" related to the item.

The estimator 86 estimates a range covering each text in image data by using the text in read data. If the estimated text range is larger than a reading range set in the setting information, the estimator 86 presents the estimated text range as a candidate for a text range to be changed.

The estimator 86 may be a learner that executes machine learning for estimating the dictionary and the text range. For example, the estimator 86 may be a learner that has learned dictionaries for identifying texts based on input items and information related to the items. In this case, the estimator 86 may receive an item of an unreadable text and information related to the item, and estimate a dictionary for identifying the text related to the item. Further, the estimator 86 may be a learner that has learned text ranges based on input texts. In this case, the estimator 86 may receive a text read from image data, and estimate a range of the text.

Figure 5:
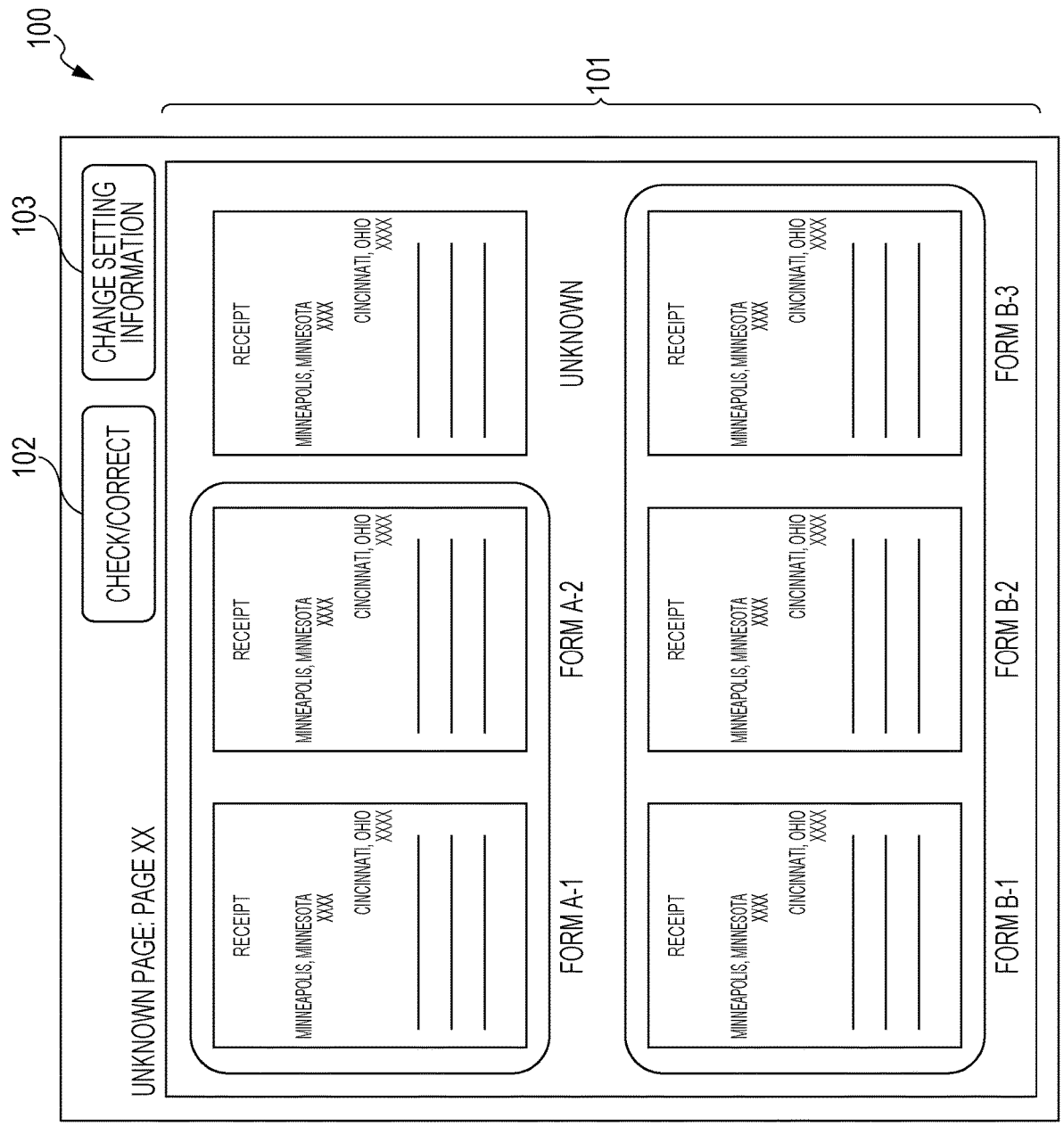
FIG. 5 illustrates an example of a form discrimination screen according to the exemplary embodiment.

Next, the display screens according to this exemplary embodiment are described with reference to FIG. 5 to FIG. 10 prior to description of the operation of the information processing apparatus 20. First, the screens related to the operational functions are described with reference to FIG. 5 to FIG. 7. FIG. 5 illustrates an example of the form discrimination screen according to this exemplary embodiment.

As illustrated in FIG. 5, the form discrimination screen 100 includes a discriminated image display field 101, a "check/correct" button 102, and a "change setting information" button 103. In the discriminated image display field 101, pieces of image data obtained by using form layout settings in the setting information are displayed while being categorized by documents. The "check/correct" button 102 is used for transmitting an instruction for transition to the check/correction screen 120. The "change setting information" button 103 is used for transmitting an instruction for transition to the setting check screen 160.

For example, the form discrimination screen 100 transitions to the check/correction screen 120 when the user checks how the documents displayed in the discriminated image display field 101 are categorized and presses the "check/correct" button 102. If the user having checked how the documents are categorized wants to change the form layout, the user presses the "change setting information" button 103 and the form discrimination screen 100 transitions to the setting check screen 160 to change the form layout setting.

Figure 6:
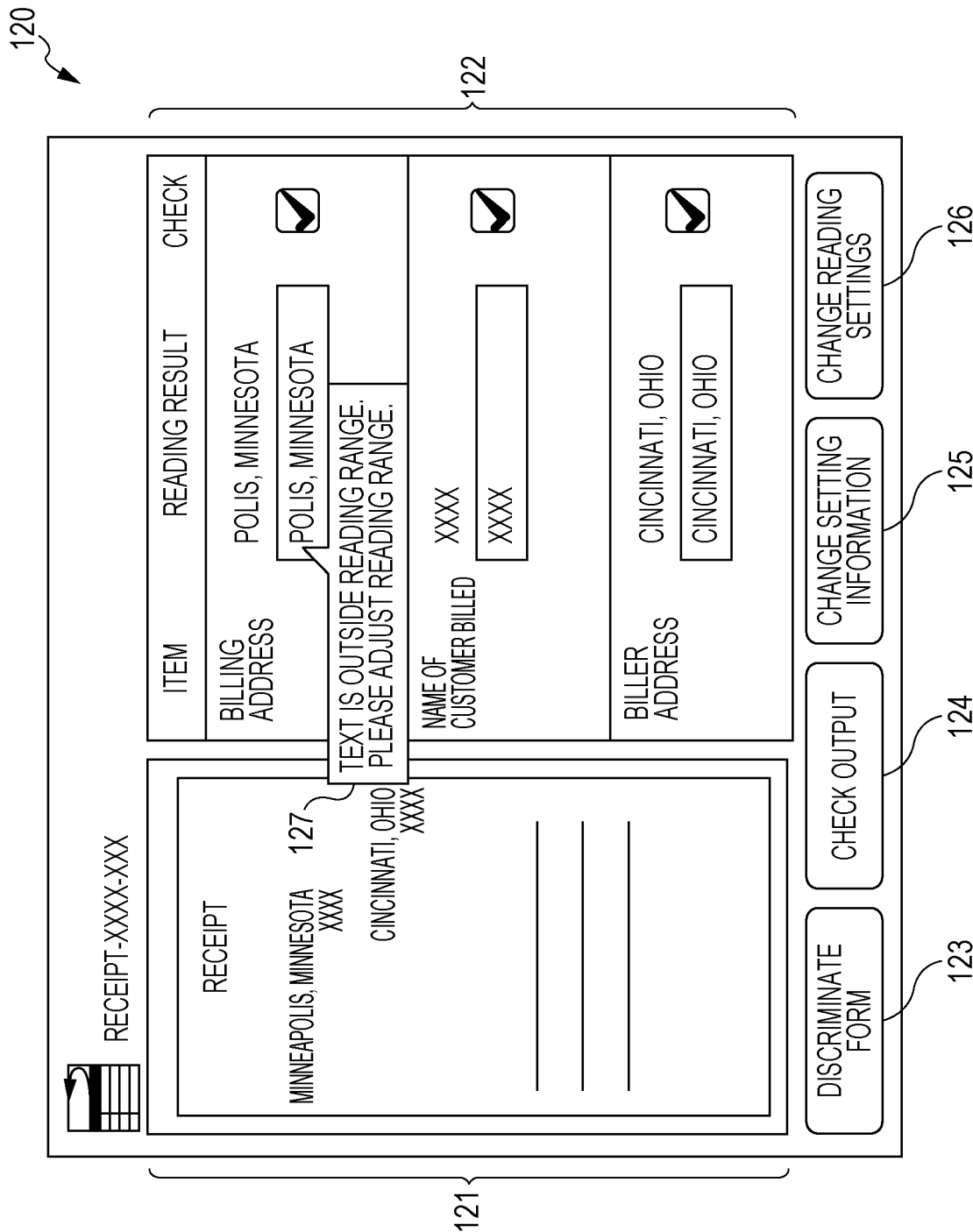
FIG. 6 illustrates an example of a check/correction screen according to the exemplary embodiment.

Next, the check/correction screen 120 is described with reference to FIG. 6. FIG. 6 illustrates an example of the check/correction screen according to this exemplary embodiment.

As illustrated in FIG. 6, the check/correction screen 120 includes an image display field 121, a reading result display field 122, a "discriminate form" button 123, a "check output" button 124, a "change setting information" button 125, and a "change reading settings" button 126. The image display field 121 shows image data in read data. The reading result display field 122 shows reading results related to the read data. The "discriminate form" button 123 is used for transmitting an instruction for transition to the form discrimination screen 100. The "check output" button 124 is used for transmitting an instruction for transition to the output check screen 140. The "change setting information" button 125 is used for transmitting an instruction for transition to the setting check screen 160. The "change reading settings" button 126 is used for transmitting an instruction for transition to the reading setting screen 180.

For example, the check/correction screen 120 transitions to the output check screen 140 by pressing the "check output" button 124, and to the form discrimination screen 100 by pressing the "discriminate form" button 123. If the user wants to change the form layout setting, the user presses the "change setting information" button 125 and the check/correction screen 120 transitions to the setting check screen 160. If the user wants to change the setting for reading texts from image data, the user presses the "change reading settings" button 126 and the check/correction screen 120 transitions to the reading setting screen 180.

If a text range estimated from a text read from image data is larger than the reading range set in the setting information, the check/correction screen 120 displays a message 127 that prompts the user to change the setting information. In other words, if inadequacy is detected in the text range set in the setting information, the check/correction screen 120 notifies the user about the change of the setting information.

Figure 7:
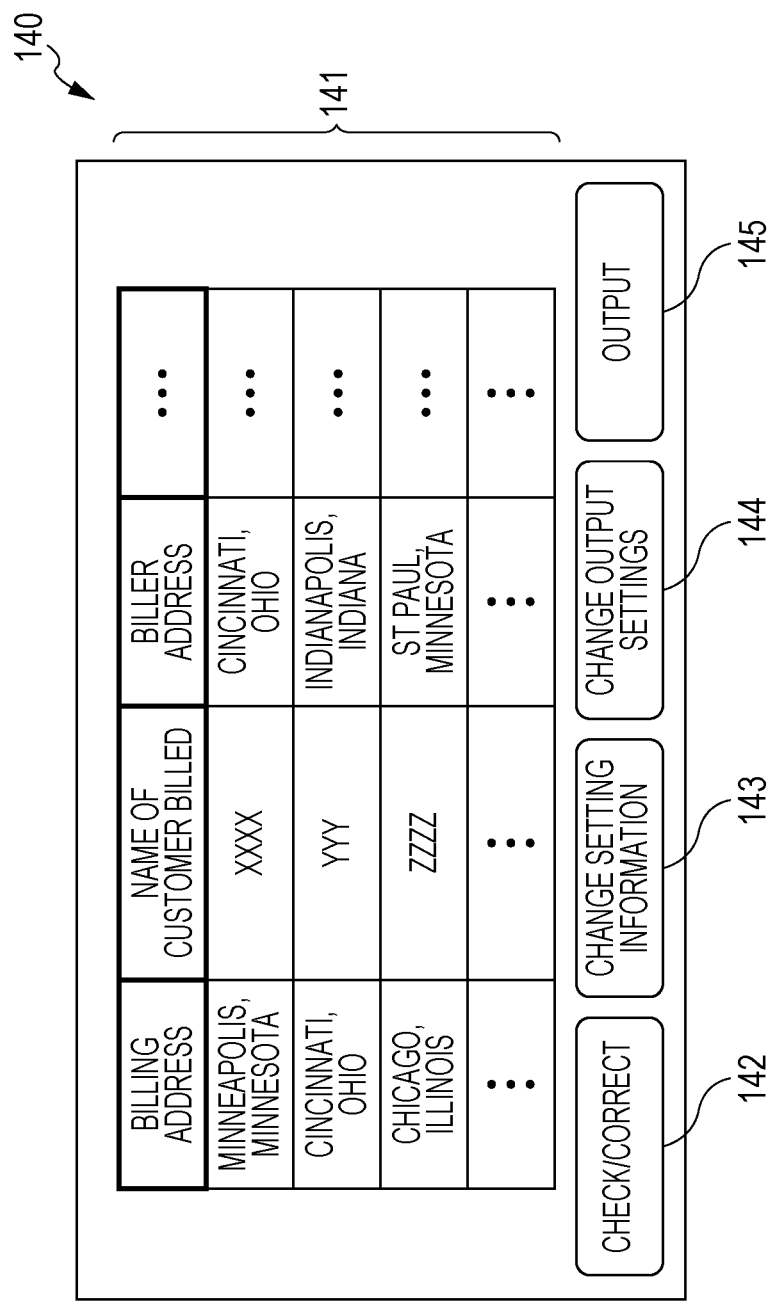
FIG. 7 illustrates an example of an output check screen according to the exemplary embodiment.

Next, the output check screen 140 is described with reference to FIG. 7. FIG. 7 illustrates an example of the output check screen 140 according to this exemplary embodiment.

As illustrated in FIG. 7, the output check screen 140 includes an output item display field 141, a "check/correct" button 142, a "change setting information" button 143, a "change output settings" button 144, and an "output" button 145. The output item display field 141 shows reading results for respective items related to read data. The "check/correct" button 142 is used for transmitting an instruction for transition to the check/correction screen 120. The "change setting information" button 143 is used for transmitting an instruction for transition to the setting check screen 160. The "change output settings" button 144 is used for transmitting an instruction for transition to the output setting screen 200. The "output" button 145 is used for transmitting an instruction to output reading results and terminate the screen display process.

For example, the reading results displayed on the output check screen 140 are output when the user checks the output item display field 141 and presses the "output" button 145. If the user having checked the output item display field 141 wants to change the settings for output items and the order of the items to be output, the user presses the "change output settings" button 144 and the output check screen 140 transitions to the output setting screen 200.

Figure 8:
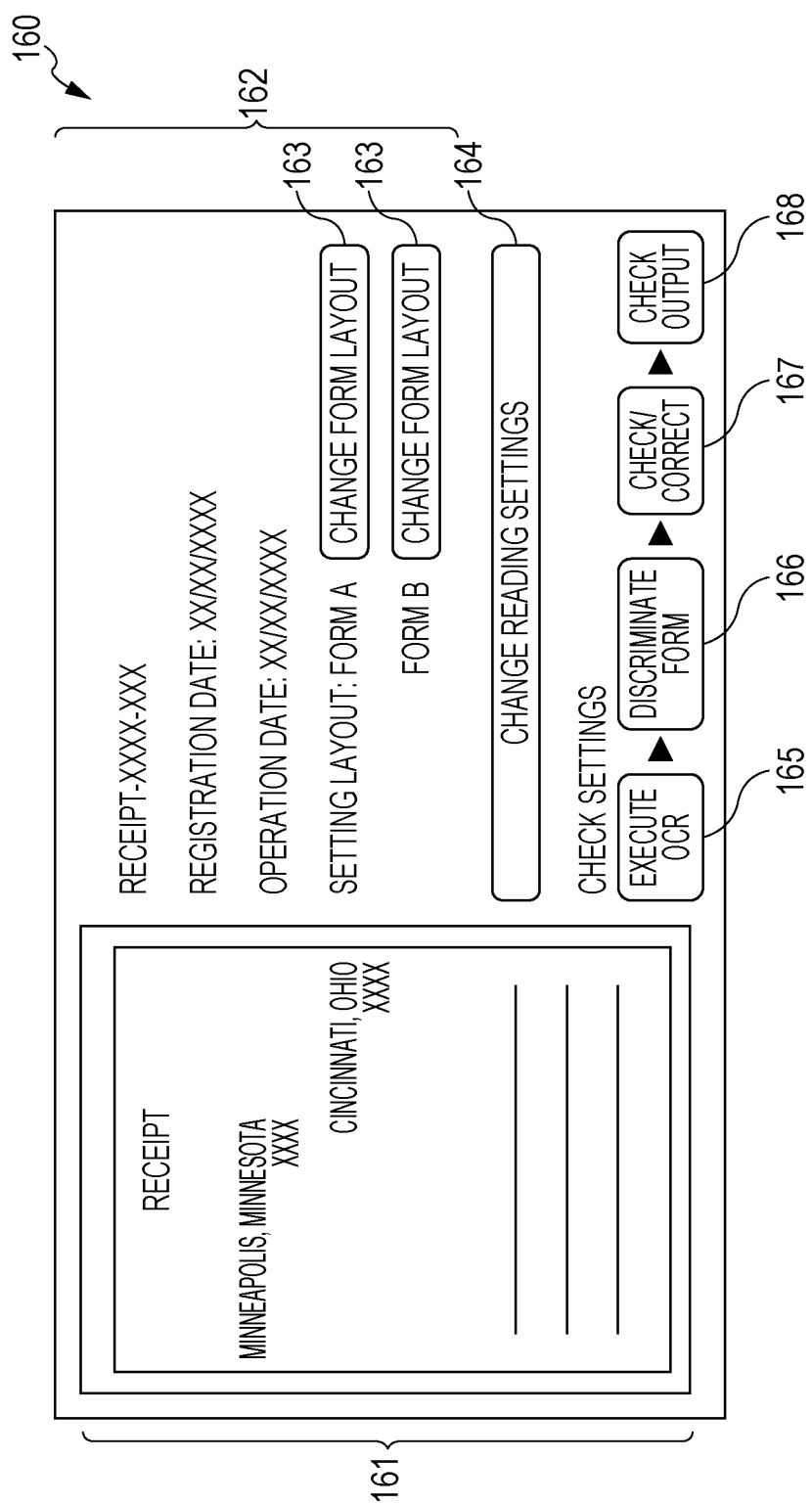
FIG. 8 illustrates an example of a setting check screen according to the exemplary embodiment.

Next, the screens related to the setting functions are described with reference to FIG. 8 to FIG. 10. FIG. 8 illustrates an example of the setting check screen 160 according to this exemplary embodiment.

As illustrated in FIG. 8, the setting check screen 160 includes an image display field 161, a read data display field 162, "change form layout" buttons 163, and a "change reading settings" button 164. The setting check screen 160 further includes an "execute OCR" button 165, a "discriminate form" button 166, a "check/correct" button 167, and a "check output" button 168. The image display field 161 shows image data in read data. For example, the read data display field 162 shows a job name and a registration date related to the read data. The "change form layout" button 163 is used for accepting a change of a form layout set to read image data in read data. The "change reading settings" button 164 is used for transmitting an instruction for transition to the reading setting screen 180. The "execute OCR" button 165 is used for transmitting instructions for re-execution of OCR and transition to the form discrimination screen 100. The "discriminate form" button 166 is used for transmitting an instruction for transition to the form discrimination screen 100. The "check/correct" button 167 is used for transmitting an instruction for transition to the check/correction screen 120. The "check output" button 168 is used for transmitting an instruction for transition to the output check screen 140.

For example, if a document is not properly categorized on the form discrimination screen 100, the form discrimination screen 100 transitions to the setting check screen 160 illustrated in FIG. 8. The setting check screen 160 accepts a change of the form layout setting for categorizing a document related to image data. Specifically, the change is accepted by pressing the "change form layout" button 163 illustrated in FIG. 8 and selecting a form layout related to the image data.

By pressing the "execute OCR" button 165, the "discriminate form" button 166, the "check/correct" button 167, or the "check output" button 168, the setting check screen 160 transitions to the screen related to the operational function with the read data that reflects the change of the setting information. For example, if a form layout is changed, the "execute OCR" button 165 is pressed to execute OCR that reflects the change of the form layout and the setting check screen 160 transitions to the form discrimination screen 100.

If the reading range setting described later or other setting that does not require re-execution of OCR is changed, read data that reflects the changed setting may be displayed on each screen by pressing the "discriminate form" button 166, the "check/correct" button 167, or the "check output" button 168.

Next, the reading setting screen 180 is described with reference to FIG. 9. FIG. 9 illustrates an example of the reading setting screen 180 according to this exemplary embodiment.

Figure 9:
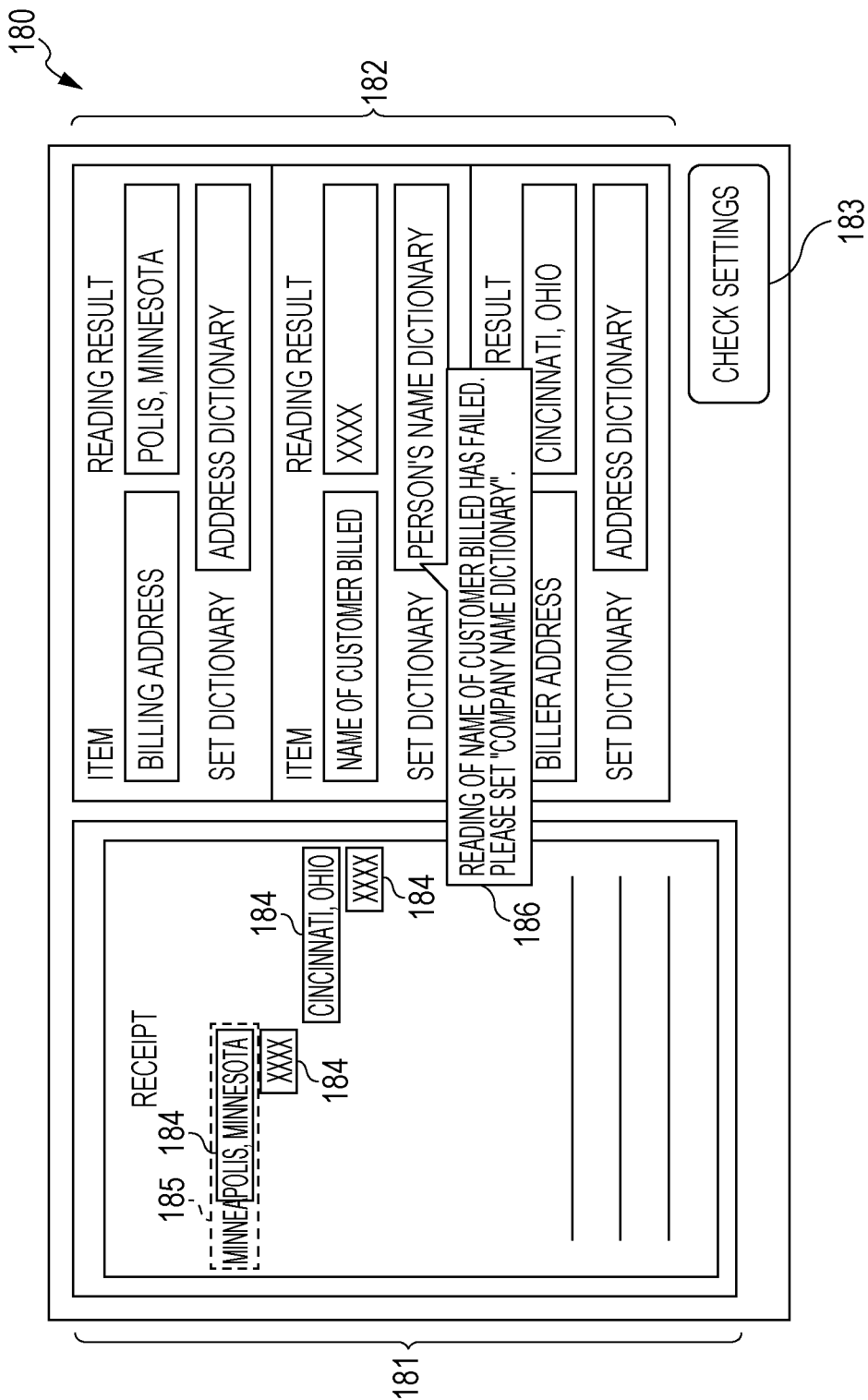
FIG. 9 illustrates an example of a reading setting screen according to the exemplary embodiment.

As illustrated in FIG. 9, the reading setting screen 180 includes an image display field 181, a reading result display field 182, and a "check settings" button 183. The image display field 181 shows image data in read data. The reading result display field 182 shows reading results related to the read data for respective items. The "check settings" button 183 is used for transmitting instructions for storage of a changed setting and transition to the setting check screen 160.

For example, the user checks pre-changed reading ranges 184 displayed in the image display field 181 and the reading results displayed in the reading result display field 182 for the respective items, and the reading setting screen 180 accepts a change of any reading range. Specifically, the user uses the mouse to drag any pre-changed reading range 184 and drop the reading range 184 at an appropriate point, thereby changing the reading range.

If a text range estimated by using a read text is larger than the reading range set in the setting information, the reading setting screen 180 displays the estimated text range in the image display field 181 as a reading range candidate 185.

In response to a change of the reading range, the reading setting screen 180 displays, in the reading result display field 182, the read text acquired in the changed reading range.

If the read text is not identified as a character code, the reading setting screen 180 displays information indicating that the text is not read properly. If a text reading dictionary estimated by using information in an item different from and related to an item of the unreadable text differs from a dictionary related to the item set in the setting information, the reading setting screen 180 displays the estimated dictionary as a candidate. For example, the reading setting screen 180 displays a message 186 for notifying the user about the failure in the text reading and about the dictionary candidate. The reading range candidate 185 and the dictionary candidate notification message 186 are examples of "proposal for change of setting information".

In response to a change of the set dictionary displayed in the reading result display field 182, the information processing apparatus 20 acquires the read text by using the changed dictionary, and causes the reading setting screen 180 to display the text in the reading result display field 182.

If the user has completed a change of setting, the reading setting screen 180 transitions to the setting check screen 160 by pressing the "check settings" button 183, and read data that reflects the changed setting is displayed by pressing a button for transition to a screen related to any operational function.

The reading setting screen 180 according to this exemplary embodiment accepts the change of a reading range or a dictionary, but is not limited thereto. The reading setting screen 180 may accept a change of other settings. For example, the reading setting screen 180 may accept a change of a display format of a read text or a change of a positional relationship between a reading reference item (key) and a corresponding reading result (value).

Next, the output setting screen 200 is described with reference to FIG. 10. FIG. 10 illustrates an example of the output setting screen 200 according to this exemplary embodiment.

Figure 10:
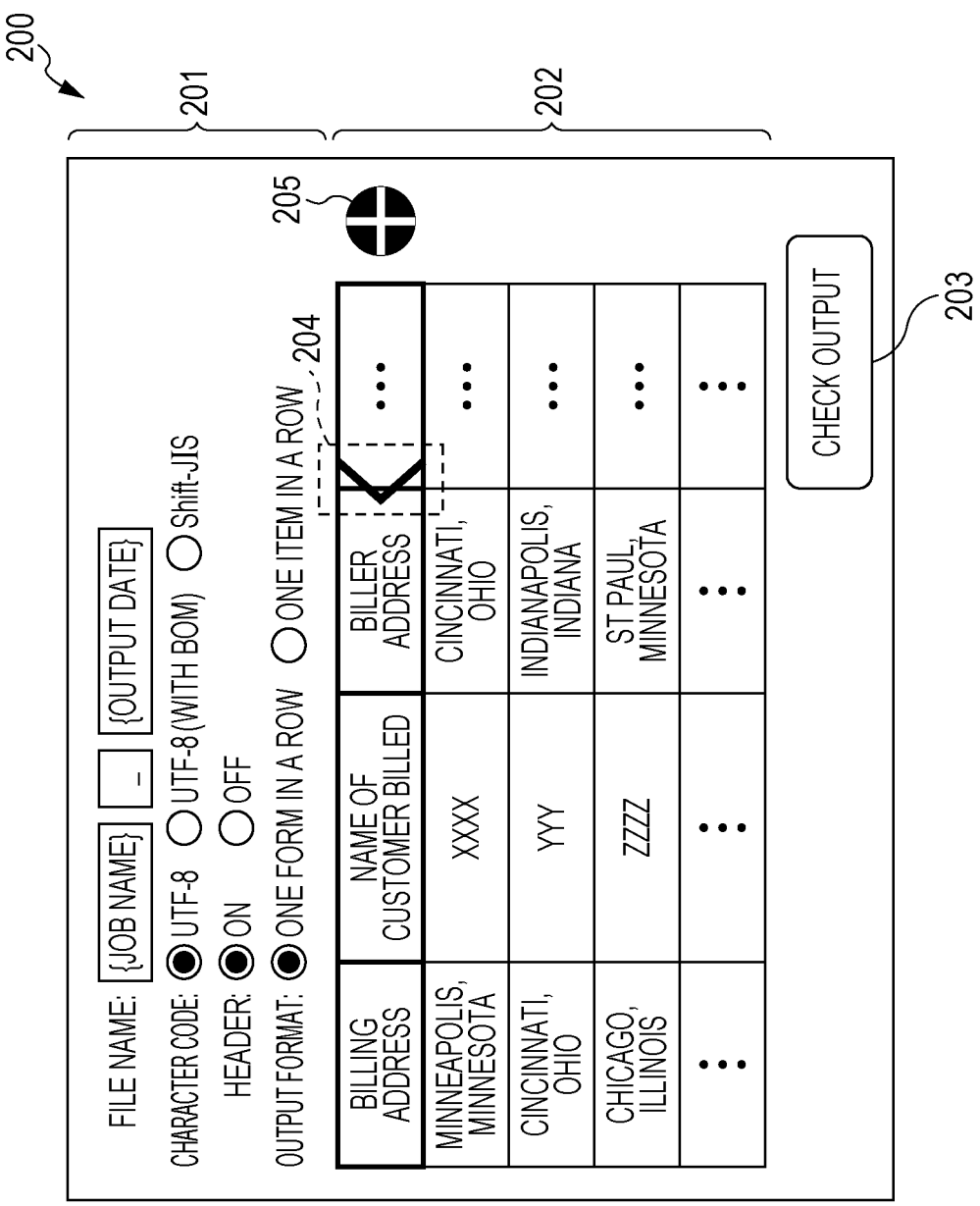
FIG. 10 illustrates an example of an output setting screen according to the exemplary embodiment.

As illustrated in FIG. 10, the output setting screen 200 includes an output setting display field 201, an output item display field 202, and a "check output" button 203. The output setting display field 201 shows output settings related to read data. The output item display field 202 shows output items and reading results associated with the items. The "check output" button 203 is used for transmitting an instruction for transition to the output check screen 140.

The output setting screen 200 accepts a change of setting for "file name", "character code", "header", or "output format" in the output setting display field 201. The output setting screen 200 also accepts a change of the order of the items to be output by pressing an item movement icon 204 displayed in the output item display field 202, and accepts addition of an output item by pressing an item addition icon 205.

When the user changes any output setting, the output setting screen 200 displays reading results related to read data in the output item display field 202 to prompt the user to check correspondence between the items and the read texts, thereby accepting the change of the output setting.

If the user has completed a change of setting, the output setting screen 200 transitions to the output check screen 140 by pressing the "check output" button 203. The user may confirm that the changed setting is reflected in the output check screen 140, and output the reading results.

In this exemplary embodiment, the setting is changed and reflected before the output, but the setting change is not limited thereto. After the output, each setting may be changed by referring to an output result. In this case, after the "output" button 145 on the output check screen 140 of FIG. 7 is pressed, the information processing apparatus 20 displays the output result and information for inquiring of the user whether to change the setting.

Figure 11:
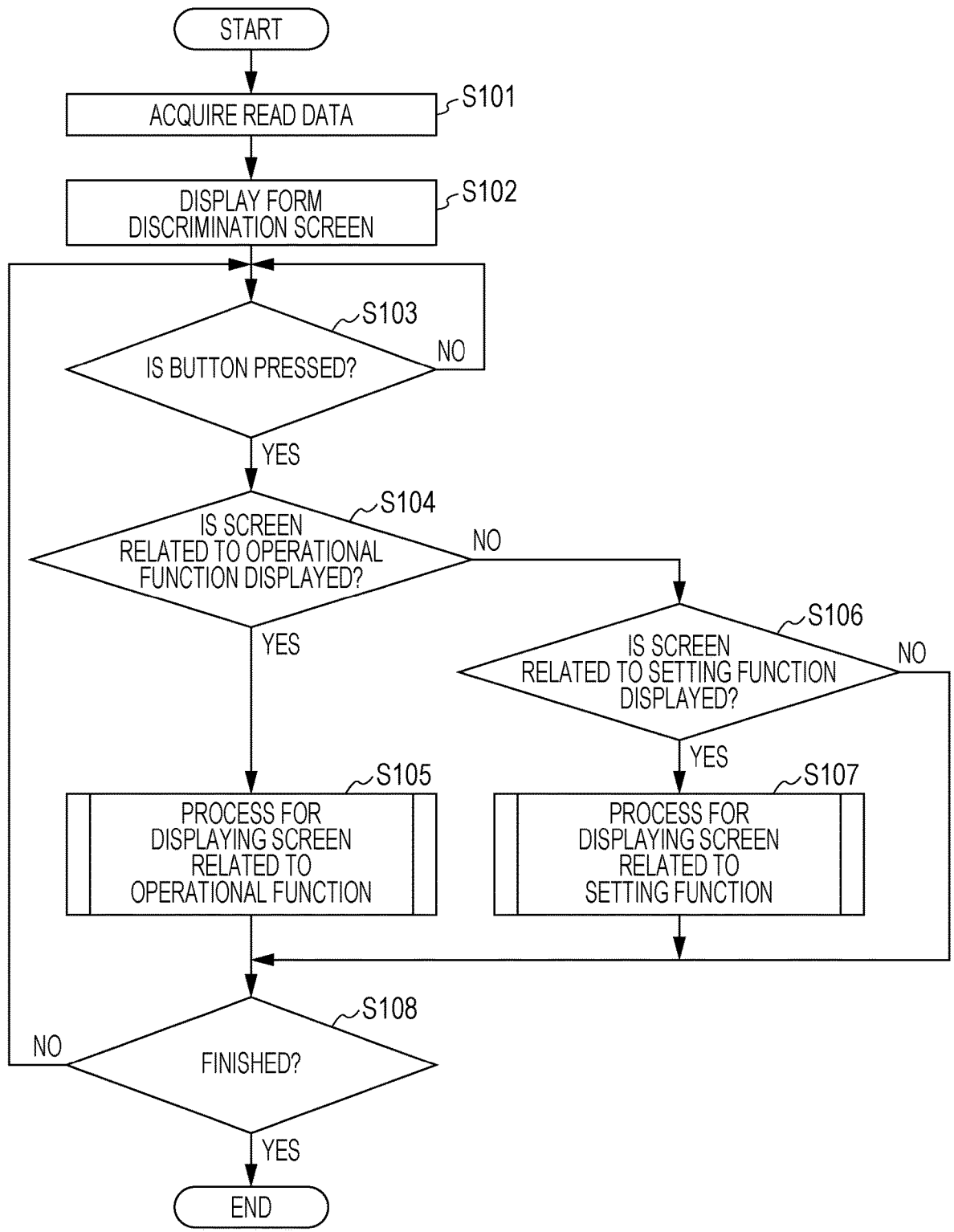
FIG. 11 is a flowchart illustrating an example of a flow of processes for controlling screen transition according to the exemplary embodiment.
Figure 12:
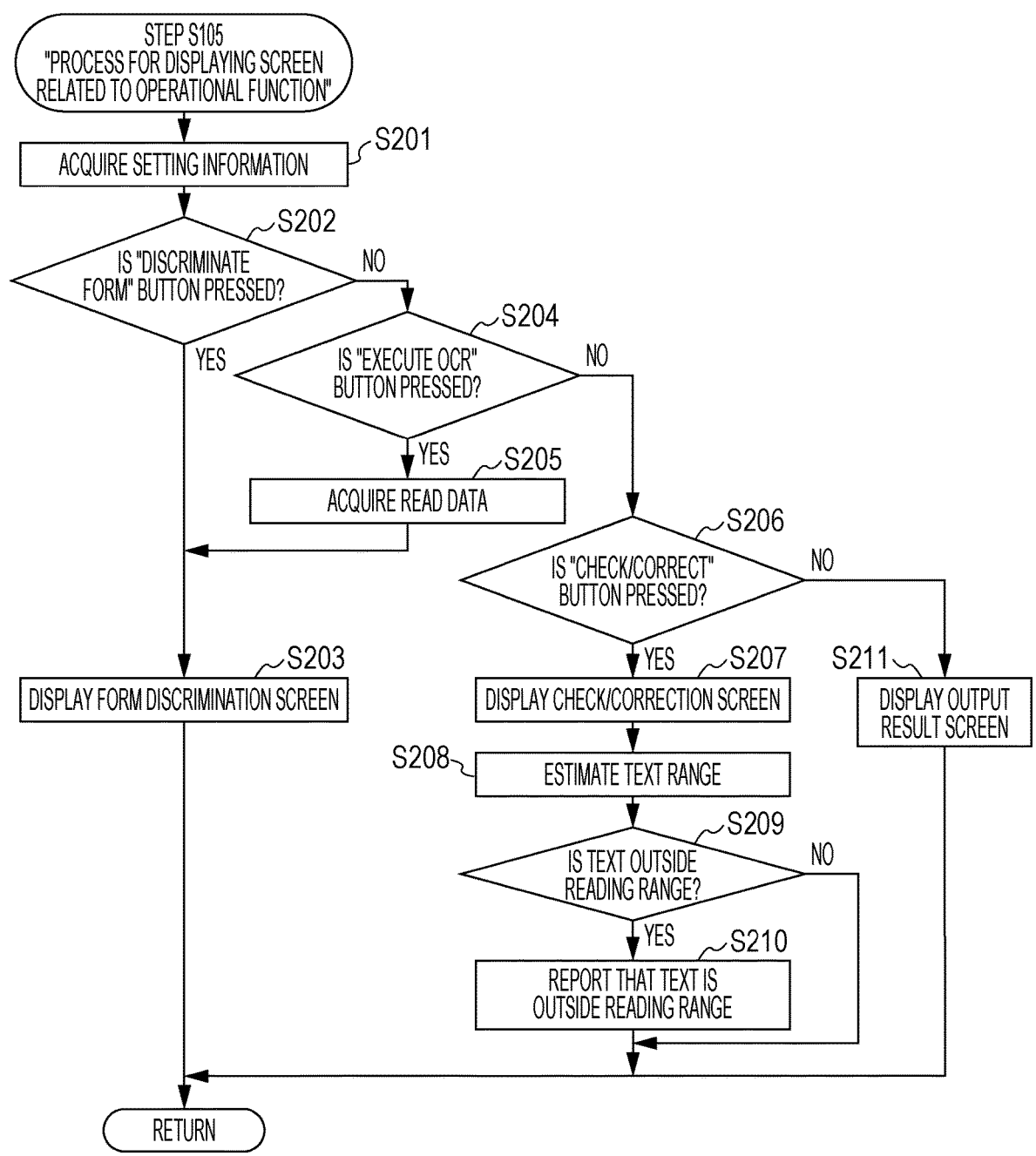
FIG. 12 is a flowchart illustrating an example of a flow of processes for displaying a screen related to an operational function according to the exemplary embodiment.
Figure 13:
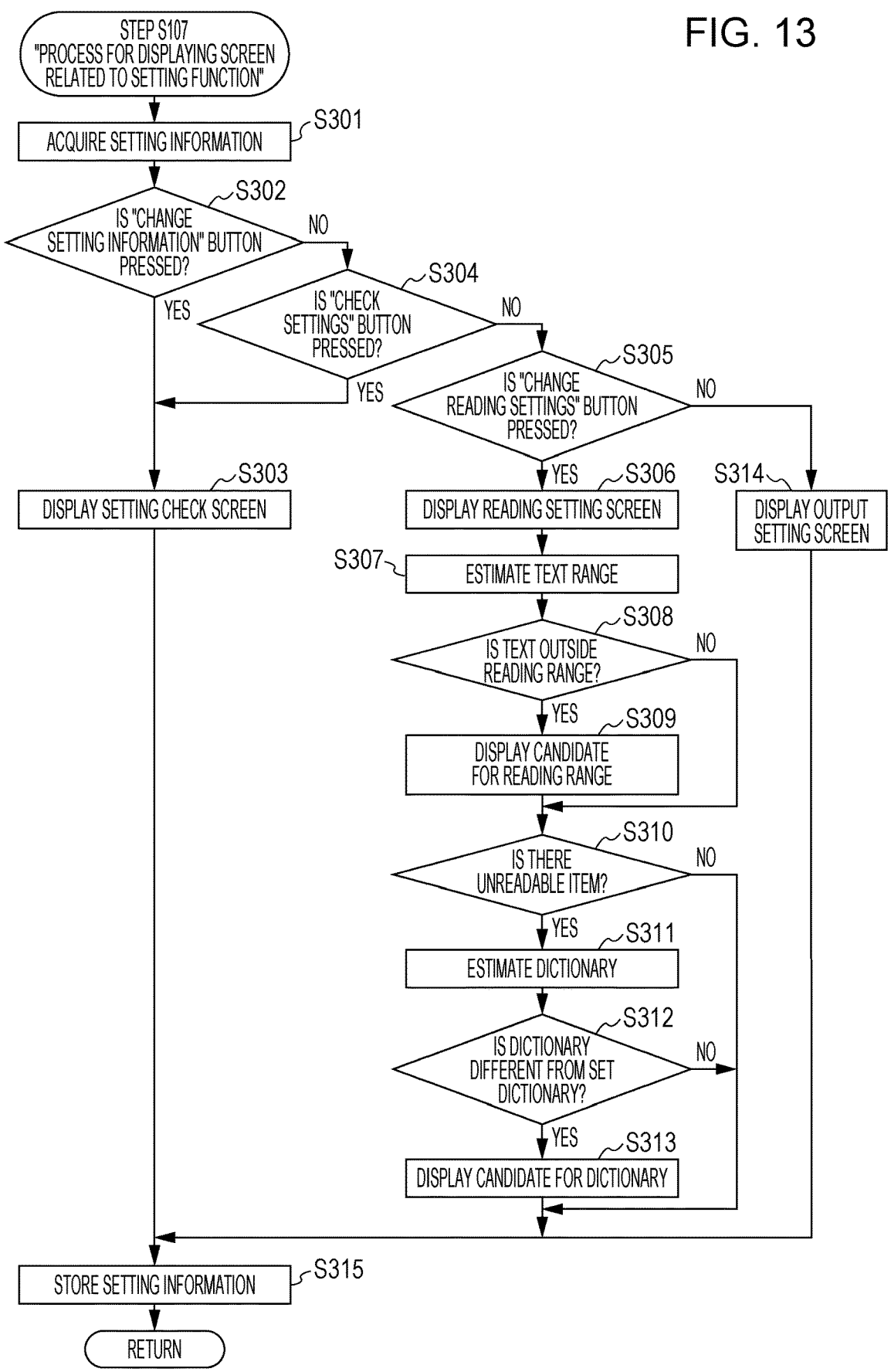
FIG. 13 is a flowchart illustrating an example of a flow of processes for displaying a screen related to a setting function according to the exemplary embodiment.

Next, the operation of the information processing apparatus 20 according to this exemplary embodiment is described with reference to FIG. 11 to FIG. 13. FIG. 11 is a flowchart illustrating an example of a flow of processes for controlling screen transition according to this exemplary embodiment. The CPU 21 reads and executes the information processing program in the ROM 22 or the storage 24 to execute the processes illustrated in FIG. 11. The processes illustrated in FIG. 11 are executed in response to an instruction to display read data.

In Step S101, the CPU 21 acquires selected read data.

In Step S102, the CPU 21 displays the form discrimination screen 100.

In Step S103, the CPU 21 determines whether any button is pressed. If any button is pressed (Step S103: YES), the CPU 21 proceeds to Step S104. If no button is pressed (Step S103: NO), the CPU 21 waits until any button is pressed.

In Step S104, the CPU 21 determines whether a button for transmitting an instruction for transition to a screen related to any operational function (form discrimination screen 100, check/correction screen 120, or output check screen 140) is pressed to display the screen. If the screen related to the operational function is displayed (Step S104: YES), the CPU 21 proceeds to Step S105. If the screen related to the operational function is not displayed (Step S104: NO), the CPU 21 proceeds to Step S106.

In Step S105, the CPU 21 executes a process for displaying the screen related to the operational function. The process for displaying the screen related to the operational function is described later in detail with reference to FIG. 12.

In Step S106, the CPU 21 determines whether a button for transmitting an instruction for transition to a screen related to any setting function (setting check screen 160, reading setting screen 180, or output setting screen 200) is pressed to display the screen. If the screen related to the setting function is displayed (Step S106: YES), the CPU 21 proceeds to Step S107. If the screen related to the setting function is not displayed (Step S106: NO), the CPU 21 proceeds to Step S108.

In Step S107, the CPU 21 executes a process for displaying the screen related to the setting function. The process for displaying the screen related to the setting function is described later in detail with reference to FIG. 13.

In Step S108, the CPU 21 determines whether the "output" button is pressed to finish the processes for controlling the screen transition. If the processes for controlling the screen transition are finished (Step S108: YES), the CPU 21 finishes the processes. If the processes for controlling the screen transition are not finished (Step S108: NO), the CPU 21 proceeds to Step S103.

Next, the process for displaying the screen related to the operational function is described with reference to FIG. 12. FIG. 12 is a flowchart illustrating an example of a flow of processes for displaying the screen related to the operational function according to this exemplary embodiment. The CPU 21 reads and executes a program for displaying the screen related to the operational function in the ROM 22 or the storage 24 to execute the process for displaying the screen related to the operational function in FIG. 12. The process for displaying the screen related to the operational function in FIG. 12 is executed in response to pressing of the "discriminate form" button, the "check/correct" button, the "check output" button, or the "execute OCR" button.

In Step S201, the CPU 21 acquires setting information related to selected read data.

In Step S202, the CPU 21 determines whether the "discriminate form" button is pressed. If the "discriminate form" button is pressed (Step S202: YES), the CPU 21 proceeds to Step S203. If the "discriminate form" button is not pressed (Step S202: NO), the CPU 21 proceeds to Step S204.

In Step S203, the CPU 21 displays the form discrimination screen 100 by using the acquired setting information.

In Step S204, the CPU 21 determines whether the "execute OCR" button is pressed. If the "execute OCR" button is pressed (Step S204: YES), the CPU 21 proceeds to Step S205. If the "execute OCR" button is not pressed (Step S204: NO), the CPU 21 proceeds to Step S206.

In Step S205, the CPU 21 acquires read data by re-executing OCR.

In Step S206, the CPU 21 determines whether the "check/correct" button is pressed. If the "check/correct" button is pressed (Step S206: YES), the CPU 21 proceeds to Step S207. If the "check/correct" button is not pressed (Step S206: NO), the CPU 21 proceeds to Step S211.

In Step S207, the CPU 21 displays the check/correction screen 120 by using the acquired setting information.

In Step S208, the CPU 21 estimates a text range related to the read data.

In Step S209, the CPU 21 determines whether the estimated text range is larger than a text reading range set in the setting information. If the estimated text range is larger than the text reading range set in the setting information (Step S209: YES), the CPU 21 proceeds to Step S210. If the estimated text range is not larger than the text reading range set in the setting information (Step S209: NO), the CPU 21 finishes the process for displaying the screen related to the operational function.

In Step S210, the CPU 21 displays a report that the estimated text range is larger than the text reading range set in the setting information.

In Step S211, the CPU 21 displays the output check screen 140 by using the acquired setting information.

Next, the process for displaying the screen related to the setting function is described with reference to FIG. 13. FIG. 13 is a flowchart illustrating an example of a flow of processes for displaying the screen related to the setting function according to this exemplary embodiment. The CPU 21 reads and executes a program for displaying the screen related to the setting function in the ROM 22 or the storage 24 to execute the process for displaying the screen related to the setting function in FIG. 13. The process for displaying the screen related to the setting function in FIG. 13 is executed in response to pressing of the "change setting information" button, the "change reading settings" button, the "change output settings" button, or the "check settings" button.

In Step S301, the CPU 21 acquires setting information related to selected read data.

In Step S302, the CPU 21 determines whether the "change setting information" button is pressed. If the "change setting information" button is pressed (Step S302: YES), the CPU 21 proceeds to Step S303. If the "change setting information" button is not pressed (Step S302: NO), the CPU 21 proceeds to Step S304.

In Step S303, the CPU 21 displays the setting check screen 160 by using the setting information and the read data.

In Step S304, the CPU 21 determines whether the "check settings" button is pressed. If the "check settings" button is pressed (Step S304: YES), the CPU 21 proceeds to Step S303. If the "check settings" button is not pressed (Step S304: NO), the CPU 21 proceeds to Step S305.

In Step S305, the CPU 21 determines whether the "change reading settings" button is pressed. If the "change reading settings" button is pressed (Step S305: YES), the CPU 21 proceeds to Step S306. If the "change reading settings" button is not pressed (Step S305: NO), the CPU 21 proceeds to Step S314.

In Step S306, the CPU 21 displays the reading setting screen 180 by using the setting information and the read data.

In Step S307, the CPU 21 estimates a range of a read text related to the read data.

In Step S308, the CPU 21 determines whether the estimated text range is larger than a text reading range set in the setting information. If the estimated text range is larger than the text reading range set in the setting information (Step S308: YES), the CPU 21 proceeds to Step S309. If the estimated text range is not larger than the text reading range set in the setting information (Step S308: NO), the CPU 21 proceeds to Step S310.

In Step S309, the CPU 21 displays the estimated text range as a reading range candidate.

In Step S310, the CPU 21 determines whether there is an item whose text is unreadable from image data. If there is an item whose text is unreadable from the image data (Step S310: YES), the CPU 21 proceeds to Step S311. If there is no item whose text is unreadable from the image data (texts of all the items are read) (Step S310: NO), the CPU 21 proceeds to Step S315.

In Step S311, the CPU 21 estimates a dictionary for identifying the text from the image data by using information related to the item of the unreadable text.

In Step S312, the CPU 21 determines whether the estimated dictionary differs from a dictionary set in the setting information. If the estimated dictionary differs from the dictionary set in the setting information (Step S312: YES), the CPU 21 proceeds to Step S313. If the estimated dictionary does not differ from the dictionary set in the setting information (the estimated dictionary is identical to the dictionary set in the setting information) (Step S312: NO), the CPU 21 proceeds to Step S315.

In Step S313, the CPU 21 displays the estimated dictionary as a candidate for the dictionary to be changed.

In Step S314, the CPU 21 displays the output setting screen 200 by using the setting information and the read data.

In Step S315, the CPU 21 stores the setting information input to each screen related to the setting function.

In this exemplary embodiment, the buttons for transition to different screens are displayed and the current screen transitions to any different screen in response to pressing of the corresponding button. The screen transition is not limited thereto. The screen may transition to the different screen by pressing a predetermined key on the keyboard or by a predetermined operation. For example, the screens related to the operational functions may transition to each other by pressing "→" and "←" keys on the keyboard on a screen related to any operational function, and the screen related to the operational function and the screen related to the setting function may transition to each other by pressing "↑" and "↓" keys on the keyboard. For example, in a case where a touch panel is used, the transition to the different screen and the change of the setting information may be accepted by a predetermined gesture such as tapping with three fingers or vertical sliding with four fingers. Thus, the instructions for the change of the setting information and the transition to the different screen may be accepted by any operation.

In this exemplary embodiment, the change of the dictionary is displayed on the reading setting screen 180 related to the setting function, but the display method is not limited thereto. The change of the dictionary may be displayed on each screen related to the operational function. For example, the change of the dictionary may be displayed on the check/correction screen 120 or the output check screen 140.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In this exemplary embodiment, the information processing program is installed in the storage, but the method for providing the information processing program is not limited thereto. The information processing program according to this exemplary embodiment may be provided by being recorded in a computer readable storage medium. For example, the information processing program according to this exemplary embodiment may be provided by being recorded in a compact disc (CD)-ROM, a digital versatile disc (DVD)-ROM, or other optical discs. The information processing program according to this exemplary embodiment may be provided by being recorded in a universal serial bus (USB) memory, a memory card, or other semiconductor memories. The information processing program according to this exemplary embodiment may be acquired from an external apparatus via a communication network connected to the communication I/F.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
acquire, by using setting information for extraction of texts from an image, an extraction result by extracting texts from a target image obtained by reading a document, or an output result to be output to an outside based on the extraction result;
display the extraction result or the output result together with a first screen configured to receive an instruction to change the setting information;
in response to reception of the instruction, display a second screen configured to accept a change of the setting information related to the target image,
wherein the setting information includes information related to a text extraction range; and
when a text range in the target image is larger than the text extraction range, cause the first screen to display a prompt to change the setting information.

2. The information processing apparatus according to claim 1, wherein the processor is configured to, in response to acceptance of the change of the setting information on the second screen, display the extraction result or the output result on the first screen by using the changed setting information.

3. The information processing apparatus according to claim 2, wherein the processor is configured to cause the second screen to display the target image and the setting information related to the target image to accept the change of the setting information.

4. The information processing apparatus according to claim 3, wherein the processor is configured to display the second screen in response to selection of an image element on the first screen for the instruction.

5. The information processing apparatus according to claim 4,
wherein the first screen comprises a plurality of first screens related to operation,
wherein the second screen comprises a plurality of second screens related to setting,
wherein the plurality of first screens are associated with the plurality of second screens, respectively, and
wherein the processor is configured to, in response to selection of the image element on any one of the first screens, display any one of the second screens associated with the first screen of the selected image element.

6. The information processing apparatus according to claim 2, wherein the processor is configured to display the second screen in response to selection of an image element on the first screen for the instruction.

7. The information processing apparatus according to claim 6,
wherein the first screen comprises a plurality of first screens related to operation,
wherein the second screen comprises a plurality of second screens related to setting,
wherein the plurality of first screens are associated with the plurality of second screens, respectively, and
wherein the processor is configured to, in response to selection of the image element on any one of the first screens, display any one of the second screens associated with the first screen of the selected image element.

8. The information processing apparatus according to claim 1, wherein the processor is configured to cause the second screen to display the target image and the setting information related to the target image to accept the change of the setting information.

9. The information processing apparatus according to claim 8, wherein the processor is configured to display the second screen in response to selection of an image element on the first screen for the instruction.

10. The information processing apparatus according to claim 9,
wherein the first screen comprises a plurality of first screens related to operation,
wherein the second screen comprises a plurality of second screens related to setting,
wherein the plurality of first screens are associated with the plurality of second screens, respectively, and
wherein the processor is configured to, in response to selection of the image element on any one of the first screens, display any one of the second screens associated with the first screen of the selected image element.

11. The information processing apparatus according to claim 1, wherein the processor is configured to display the second screen in response to selection of an image element on the first screen for the instruction.

12. The information processing apparatus according to claim 11,
wherein the first screen comprises a plurality of first screens related to operation,
wherein the second screen comprises a plurality of second screens related to setting,
wherein the plurality of first screens are associated with the plurality of second screens, respectively, and
wherein the processor is configured to, in response to selection of the image element on any one of the first screens, display any one of the second screens associated with the first screen of the selected image element.

13. An information processing apparatus comprising:
a processor configured to:
acquire, by using setting information for extraction of texts from an image, an extraction result by extracting texts from a target image obtained by reading a document, or an output result to be output to an outside based on the extraction result;
display the extraction result or the output result together with a first screen configured to receive an instruction to change the setting information;
in response to reception of the instruction, display a second screen configured to accept a change of the setting information related to the target image;
display a proposal for the change of the setting information; and
when changing a text extraction range in the setting information, cause the second screen to display a range covering a text in the target image.

14. The information processing apparatus according to claim 13,
wherein the target image includes a plurality of related texts,
wherein the setting information includes information related to dictionaries for identifying texts, and
wherein the processor is configured to: if a first related text among the plurality of related texts is not identified, estimate a dictionary for identifying the first related text by using an extraction result of a second related text; and cause the second screen to display the estimated dictionary.

15. A non-transitory computer readable medium storing an information processing program causing a computer to execute a process comprising:
  acquiring, by using setting information for extraction of texts from an image, an extraction result by extracting texts from a target image obtained by reading a document, or an output result to be output to an outside based on the extraction result;
  displaying the extraction result or the output result together with a first screen configured to receive an instruction to change the setting information;
  displaying, in response to reception of the instruction, a second screen configured to accept a change of the setting information related to the target image,
  wherein the setting information includes information related to a text extraction range; and
  when a text range in the target image is larger than the text extraction range, causing the first screen to display a prompt to change the setting information.

* * * * *